United States Patent Office 3,103,505
Patented Sept. 10, 1963

3,103,505
SCHIFF BASES OF 3-KETO STEROIDS
Klaus Irmscher, Heinz-Jürgen Mannhardt, Klaus Brückner, and Joseph Gillissen, Darmstadt, Germany, assignors to E. Merck Aktiengesellschaft, Darmstadt, Germany
No Drawing. Filed Nov. 9, 1961, Ser. No. 151,164
Claims priority, application Germany Nov. 12, 1960
20 Claims. (Cl. 260—211)

This invention relates to novel Schiff base derivatives of 3-keto steroids.

This invention reveals that the physiological efficaciousness of a group of 3-keto steroids of the androstane and 19-nor-androstane series is considerably increased upon peroral administration if these compounds are converted into the Schiff bases of Formula I

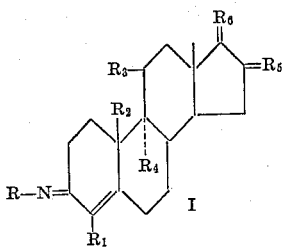

wherein:
$R_1$ represents H or OH
$R_2$ represents H or $CH_3$
$R_3$ represents H or $\beta$-OH
$R_4$ represents H or F
$R_5$ represents H,H or $CH_2$
$R_6$ represents $\alpha$-H and $\beta$-OH, or $\beta$-OH and $\alpha$-alkyl having 1–3 carbon atoms, or =N—R
R represents an alkyl group having 1–8 carbon atoms, or cyclohexyl or an hydroxyalkyl group having 3–8 carbon atoms and 1–5 hydroxyl groups which compounds may also contain a double bond in the 1,2-position.

The principal object of this invention is, therefore, the disclosure of new derivatives of 3-keto steroids of the androstane and 19-nor-androstane series of Formula I as well as of their derivatives unsaturated in the 1,2-position.

Another object of this invention is a novel process for the preparation of these new derivatives.

Still other objects and advantages of this invention will become apparent upon further study of the specification and appended claims.

As representative examples of the novel compounds of this invention, there can be mentioned the following:
3-($\beta$,$\gamma$-dihydroxy-n-propyl)-imino-17$\alpha$-methyl - 4 - androstene-17$\beta$-ol
3-($\beta$-hydroxy-n-propyl) - imino - 17$\alpha$ - methyl - 4 - androstene-17$\beta$-ol
3-($\gamma$-hydroxy-n-propyl) - imino - 17$\alpha$ - methyl - 4 - androstene-17$\beta$-ol
3-($\alpha$-hydroxymethyl-n-propyl)-imino-17$\alpha$-methyl - 4 - androstene-17$\beta$-ol
3-(1'-desoxysorbityl-1')-imino-17$\alpha$-methyl-4 - androstene-17$\beta$-ol
3,17-bis-($\beta$,$\gamma$-dihydroxy-n-propyl) - imino - 1,4 - androstadiene
3-($\beta$-hydroxy-n-propyl)-imino-1,4-androstadiene - 17$\beta$-ol-17-propionate
3-($\beta$-hydroxy-n-propyl) - imino - 4 - androstene - 17 - ol-17-propionate
3,17-bis-($\beta$,$\gamma$-dihydroxy-n-propyl)-imino-4-androstene
3,17-bis-(1'-desoxysorbityl-1')-imino-1,4-androstadiene
3-(1'-desoxy-D-sorbityl-1')-imino-4-androstene-17$\beta$-ol
3-($\beta$,$\gamma$-dihydroxy-n-propyl)-imino-4-androstene-17$\beta$-ol
3-(1'-desoxy-L-arabityl-1')-imino-4-androstene-17$\beta$-ol
3-(1'-desoxy-L-arabityl-1')-imino-17$\alpha$ - methyl - 4 - androstene-17$\beta$-ol
3,17-bis-(1'-desoxy-L-arabityl-1')-imino-4-androstene
3-($\beta$,$\gamma$-dihydroxy-n-propyl) - imino - 17$\alpha$ - methyl - 1,4-androstadiene-17$\beta$-ol
3,17-bis-(1'-desoxy-L-arabityl-1')-imino-1,4-androstadiene
3,17-bis-(1'-desoxy-D-sorbityl-1')-imino-4-androstene
3,17-bis-($\beta$,$\gamma$ - dihydroxy - n - propyl) - imino - 9$\alpha$ - fluoro-1,4-androstadiene-11$\beta$-ol
3-(n-butyl)-imino-17$\alpha$-methyl-4-androstene-17$\beta$-ol
3,17-bis-(1'-desoxy-D-xylityl-1')-imino-1,4-androstadiene
3-(1'-desoxy-D-sorbityl-1')-imino - 17$\alpha$ - methyl - 1,4 - androstadiene-17$\beta$-ol
3-(1'-desoxy-D-sorbityl-1')-imino-1,4-androstadiene - 17$\beta$-ol
3-(1'-desoxy-L-arabityl-1')-imino-1,4-androstadiene - 17$\beta$-ol
3-(1'-desoxy-D-sorbityl-1') - imino - 16 - methylene - 17$\alpha$-methyl-1,4-androstadiene-17$\beta$-ol
3-(1'-desoxy-L-arabityl-1') - imino - 17$\alpha$ - methyl - 1,4-androstadiene-17$\beta$-ol
3-(1'-desoxy-D-xylityl-1')-imino-17$\alpha$ - methyl - 4 - androstene-17$\beta$-ol
3-(1'-desoxy-L-arabityl-1') - imino - 16 - methylene - 17$\alpha$-methyl-1,4-androstadiene-17$\beta$-ol
3-(1'-desoxy-D-xylityl-1') - imino - 17$\alpha$ - methyl - 1,4 - androstadiene-17$\beta$-ol
3-(1'-desoxy-D-xylityl-1')-imino-1,4 - androstadiene - 17$\beta$-ol
3-(1'-desoxy-D-xylityl - 1') - imino - 16 - methylene - 17$\alpha$-methyl-1,4-androstadiene-17$\beta$-ol
3-($\beta$,$\gamma$-dihydroxy-n-propyl) - imino - 16 - methylene - 17$\alpha$-methyl-1,4-androstadiene-17$\beta$-ol
3-($\beta$,$\gamma$-dihydroxy-n - propyl) - imino - 1,4 - androstadiene-17$\beta$-ol
3-($\beta$,$\gamma$-dihydroxy-n-propyl) - imino - 4 - androstene - 17$\beta$-ol-17-propionate
3-($\beta$,$\gamma$-dihydroxy-n - propyl) - imino - 1,4 - androstadiene-17$\beta$-ol-17-propionate
3-($\beta$,$\gamma$-dihydroxy-n-propyl)-imino - 9$\alpha$ - fluoro - 4 - androstene-11$\beta$,17$\beta$-diol
3-($\delta$-hydroxybutyl)-imino - androstane - 17$\beta$ - ol - 4 - one-17-propionate These new compounds exhibit considerably increased effectiveness over their parent compounds, when perorally administered. Moreover, there can be marked and desirable unexpected differences in the effects. For example, among the new Schiff bases there are compounds which not only exhibit an increased anabolic effect, but also a considerable improvement in the ratio of the anabolic and the androgenic effects. Furthermore, the introduction of a second imino group in the 17-position causes, upon oral administration, approximately doubles the increase in effect obtained as compared to only the introduction of the first imino group in the 3-position.

According to this invention, the novel compounds can be utilized as anabolic agents and can be prepared in all forms suitable for peroral administration, such as pills, tablets, dragees, syrups, elixirs, solutions, etc.

The new compounds were also tested and found to be useful for the treatment of rats. Specifically, the new compounds were tested in the musculus levator ani and in the seminal vesicle weight test of rats (Proceedings of the Society for Experimental Biology and Medicine, volume 83, page 175, 1953). Thus, these compounds are suited for all treatments requiring anabolic agents, for example, all catabolic conditions, convalescence, progressive muscular dystrophy, difficultly healing fractures, and for economizing insulin for diabetes. The daily dose varies between 2 and 50 mg. according to indication. The new compounds are preferably used in tablet form at 5 and 10 mg.

The following tables demonstrate the increased activity of these drugs upon peroral administration as compared to the parent compounds which are not Schiff bases. The daily dose was 5 and 10 mg.

TABLE I

| | |
|---|---|
| 17α-methyl-1-dehydro-testosterone | 1.00 |
| 3-(1'-desoxy-L-arabityl-1')-imino-17α-methyl-1,4-androstadiene-17β-ol | 1.30 |
| 17α-methyl-testosterone | 0.93 |
| 3-(α-hydroxymethyl-n-propyl)-imino-17α-methyl-4-androstene-17β-ol | 1.58 |
| 3-(1'-desoxy-D-sorbityl-1')-imino-17α-methyl-4-androstene-17β-ol | 1.01 |
| 3-(1'-desoxy-D-xylityl-1')-imino-17α-methyl-4-androstene-17β-ol | 1.55 |
| 3-n-butyl-imino-17α-methyl-4-androstene-17β-ol | 1.27 |

The following Table II shows the increase in the ratio of anabolic to androgenic activity as compared to the parent compounds, the daily dose being 5, 10 and 25 mg.

TABLE II

| | |
|---|---|
| 17α-methyl-testosterone | 0.36 |
| 3-(1'-desoxy-L-arabityl-1')-imino-17α-methyl-4-androstene-17β-ol | 0.64 |
| 3-(1'-desoxy-D-xylityl-1')-imino-17α-methyl-4-androstene-17β-ol | 1.10 |
| 3-n-butyl-imino-17α-methyl-4-androstene-17β-ol | 1.15 |
| 17α-methyl-1-dehydro-testosterone | 0.49 |
| 3-(β,γ-dihydroxy-n-propyl)-imino-17α-methyl-1,4-androstadiene-17β-ol | 0.63 |
| 3-(1'-desoxy-D-xylityl-1')-imino-17α-methyl-1,4-androstadiene-17β-ol | 0.66 |
| 3-(1'-desoxy-L-arabityl-1')-imino-17α-methyl-1,4-androstadiene-17β-ol | 0.68 |
| 3-(1'-desoxy-D-sorbityl-1')-imino-17α-methyl-1,4-androstadiene-17β-ol | 0.90 |
| 9α-fluoro-11β-hydroxy-testosterone | 0.78 |
| 3-(β,γ-dihydroxy-n-propyl)-imino-9α-fluoro-4-androstene-11β,17β-diol | 0.88 |
| 16-methylene-17α-methyl-testosterone | 0.69 |
| 3-(β,γ-dihydroxy-n-propyl)-imino-16-methylene-17α-methyl-1,4-androstadiene-17β-ol | 1.11 |
| 3-(1'-desoxy-L-arabityl-1')-imino-16-methylene-17α-methyl-1,4-androstadiene-17β-ol | 1.29 |
| 3-(1'-desoxy-D-sorbityl-1')-imino-16-methylene-17α-methyl-1,4-androstadiene-17β-ol | 1.56 |
| 3-(1'-desoxy-D-xylityl-1')-imino-16-methylene-17α-methyl-1,4-androstadiene-17β-ol | 1.93 |

The novel compounds of this invention are prepared by reacting a compound of the formula

wherein X represents two hydrogen atoms or an alkylidene group having 2–5 carbon atoms, and wherein R represents an alkyl group having 1–8 carbon atoms, or cyclohexyl, or an hydroxyalkyl group having 3–8 carbon atoms and 1–5 hydroxyl groups, with a compound conforming to the following Formula II or its derivatives unsaturated in the 1,2-position.

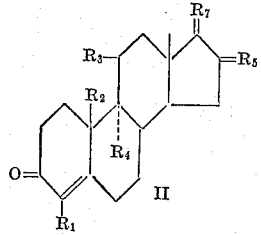

wherein $R_1$–$R_5$ represent the same moieties as in Formula I, and wherein $R_7$ represents =O; α-H and β-OH; β-OH and an alkyl group having 1–3 carbon atoms.

In the case of the reaction of the 3-keto steroids of Formula I with the primary amines of the formula R—NH$_2$ (R having the indicated significance) frequently the amines themselves can simultaneously act as a solvent. In other cases, solvents, such as chloroform, benzene, toluene, ethanol, butanol, dioxane, etc., or a mixture of several of these solvents, can be utilized. Often it is advisable to choose a solvent pair, one component which easily dissolves the 3-keto steroid and the primary amine, the other component forming an azeotrope with the water formed in the course of the reaction, whereby the water is continuously removed from the reaction solution.

When operating in solvents a small excess of the amine over the stoichiometric ratio is sufficient.

In order to obtain an economically desirable rate of reaction, it is preferable to heat the reactant solution to 50–120° C. If the operation is conducted with the amine as the solvent, the Schiff bases crystallize mostly directly, or after diluting with water, or they can be isolated from the aqueous phase by extraction. If solvents are employed, the Schiff bases are preferably obtained by crystallizing after concentrating the reaction solution, or completely removing the solvents and crystallizing the residue.

With respect to the substituent R of the primary amine, specific examples of the alkyl group containing 1–8 carbon atoms include straight and branched chain radicals, such as methyl, ethyl, propyl, isopropyl, butyl, sec-butyl, isobutyl, tertiary butyl, octyl, etc. The hydroxyalkyl radicals include, for example, among those having 3–8 carbon atoms and 1–5 hydroxyl groups, γ-hydroxypropyl, γ-hydroxypentyl, β-hydroxyoctyl, β,γ-dihydroxypropyl, 1'-desoxy-L-arabityl or 1'-desoxy-D-xylityl. R can also represent cyclohexyl.

In addition to the foregoing described process, it is possible to obtain the compounds of Formula I by reacting the 3-keto steroids of Formula II with the Schiff base of an aliphatic carbonyl compound. The Schiff bases of Formula I are thereby formed and the carbonyl moiety is freed.

According to this invention, particularly good yields are obtained if equilibrium conditions are unbalanced by separating a reaction produce during the reaction. Thus, almost quantitative yields are obtained if the freed carbonyl compound is distilled from the reaction zone. It is, of course, also possible to simply wait until the reaction stops at a certain equilibrium and then to cleave the reaction product according to conventional methods, for example, chromatography, crystallization or distillation. The side product carbonyl compound isolated thereby can thereafter be reconverted into a Schiff base and thus can be recycled to serve as raw material. If desired, this reaction may also be accomplished in a continual manner.

As a rule, it is generally advisable to carry out this reaction in the presence of a customary inert solvent, such as benzene, toluene, xylene or alcohols, such as methanol and ethanol, or chloroform, carbon tetrachloride, dioxane, or methylene chloride. The presence of a solvent is, however, not absolutely necessary, since the Schiff base used for the reaction may act as a solvent. An excess of the Schiff base can be utilized for the reaction; however, the reaction also yields good results when stoichiometric proportions are applied. In the latter case, it is advantageous to separate the carbonyl compound during the reaction from the reaction zone.

As the initial material it is advisable to use a Schiff base of a low-boiling carbonyl compound, since, after the completed reaction, the freed low-boiling carbonyl compound is easily distilled from the reaction zone.

Carbonyl compounds having a boiling point of below 100° C. are particularly suitable as low-boiling carbonyl compounds. The process of distilling the carbonyl compound can be carried out more easily and considerably more simply than the removal of the water resulting from the reaction of a primary amine with the 3-keto steroids of Formula II. Thus, possible side reactions are largely avoided.

As low-molecular carbonyl compounds, especially suitable are those with 2–5 carbon atoms, such as acetone, diethyl ketone, di-n-propyl ketone, methyl ethyl ketone, and other homologs, also formaldehyde, acetaldehyde, propionaldehyde, butyraldehyde and their other homologs thereof. These carbonyl compounds are converted into particularly suitable Schiff bases, if they are reacted with amines of the formula R—NH$_2$ (R having the indicated significance) for example, with methylamine, ethylamine, n-propylamine, n-butylamine, isopropylamine, isobutylamine, ter.-butylamine, cyclohexylamine, sec.-butylamine, isoamylamine, n-hexylamine, n-octylamine, 2-ethylhexylamine, β-hydroxyethylamine or others, lower aliphatic primary amines substituted singly or with a plurality of hydroxyl groups, such as 2-aminopropanol-1; 2-aminobutanol-1; 2-aminopentanol-1; 1-aminopropanol-2; 1-aminobutanol-2; 1-aminopentanol-2; etc. 3-aminopropanol-1; 4-aminobutanol-1; 5-aminopentanol-1; etc. 2-aminopropanediol-1,3; 2-aminobutanetriol-1,3,4; 2-aminopentanetetrol-1,3,4,5; etc. 1-aminopropanediol-2,3; 1-aminobutanetriol-2,3,4; 1-aminopentanetetrol-2,3,4,5 (for example, L-arabamine or D-xylamine), D-glucamine.

According to this invention, it is also possible to prepare Schiff bases containing imino groups in the 3- and 17-positions, but, of course, the 17-keto must not be sterically blocked.

The Schiff bases of 4-hydroxy-3-keto steroids obtained according to this invention, exist mostly in the tautomeric keto form so that a 4,5-double bond does not appear in the formula of the final product.

The keto steroids of the androstane and 19-nor-androstane series are known and available compounds, and to illustrate the reaction of these compounds even further, the following examples are presented, which examples, however, are merely preferred specific embodiments and are not in any way limitative of the remainder of the specification and appended claims.

Example 1

3-(β,γ-DIHYDROXY-n-PROPYL)-IMINO-17α-METHYL-4-ANDROSTENE-17β-OL (a) 10 g. of 17α-methyltestosterone are dissolved in 100 cc. chloroform and mixed with 3.3 g. 1-aminopropane-2,3-diol. Absolute ethanol is added until a homogeneous soltuion is obtained, which solution is then diluted with 100 cc. benzene. This mixture is slowly concentrated on a steam bath, and then any residual solvent is evaporated under reduced pressure. The remaining compound, crystallized from ethyl acetate, has the following properties: melting point 183° C.; $(\alpha)_D^{26}$: +112° (ethanol), $\lambda_{max}$ 241 mμ, $E_{1\ cm.}^{1\%}$ 426 (96% ethanol)

In the same manner, from 17α-propyl-19-nor-testosterone, the 3-(β,γ-dihydroxy-n-propyl)-imino-17α-propyl-19-nor-4-androstene-17β-ol is obtained.

(b) 10 g. of 17α-methyltestosterone are dissolved in 100 cc. chloroform and mixed with 5.26 g. 2-(β,γ-dihydroxy-n-propyl)-iminobutane. Absolute ethanol is added until a homogeneous solution is obtained, which solution is then diluted with 100 cc. benzene. This mixture is slowly concentrated on a steam bath, any residual solvent being evaporated under reduced pressured. The remaining compound, crystallized from ethyl acetate, melts at 183° C.

Example 2

3-(β-HYDROXY-n-PROPYL)-IMINO-17α-METHYL-ANDROSTENE-17β-OL (a) 10 g. of 17α-methyltestosterone are mixed with 2.7 g. of freshly distilled 1-aminopropanol-2 in 100 cc. absolute ethanol and 50 cc. benzene. This mixture is then slowly distilled and residual solvent is removed under reduced pressure. The remaining compound is treated with hot ethyl acetate until crystallization begins, then mixed with 10% of the ester in methanol, boiled and filtered, yielding a compound having the following properties: melting point 148° C.; $(\alpha)_D^{25}$: +104°, $\lambda_{max}$ 240 mμ, $E_{1\ cm.}^{1\%}$ 591 (96% ethanol)

In the same way 17α-methyl-19-nor-testosterone is converted to 3-(β-hydroxy-n-propyl)-imino-17α-methyl-19-nor-4-androstene-17β-ol.

(b) 10 g. of 17α-methyltestosterone are mixed with 4.65 g. of freshly distilled 2-(β-hydroxy-n-propyl)-iminobutane in 100 cc. absolute ethanol and 50 cc. benzene. The mixture is then slowly distilled and the residual solvent is removed under reduced pressure. The remaining compound is treated with hot ethyl acetate until crystallization begins; then mixed with 10% of the ester in methanol, boiled and filtered: melting point 148° C.

Example 3

3-(γ-HYDROXY-n-PROPYL)-IMINO-17α-METHYL-4-ANDROSTENE-17β-OL (a) 10 g. of 17α-methyltestosterone are mixed with 2.7 g. freshly distilled 3-amino-propanol-1 in 150 cc. absolute ethanol and 50 cc. benzene. The mixture is then slowly distilled and the residual solvent is removed under reduced pressure. The remaining compound, recrystallized from acetone, exhibits the following properties: melting point 136° C.; $(\alpha)_D^{25}$: +128°, $\lambda_{max}$ 240 mμ, $E_{1\ cm.}^{1\%}$ 552 (96% ethanol)

(b) 10 g. of 17α-methyltestosterone are mixed with 4.65 g. freshly distilled 2-(γ-hydroxy-n-propyl)-iminobutane in 150 cc. absolute ethanol and 5 cc. benzene. The mixture is then slowly distilled and the residual solvent is removed under reduced pressure. The resulting compound, recrystallized from acetone, melts at 136° C.

Example 4

3-(α-HYDROXYMETHYL-n-PROPYL)-IMINO-17α-METHYL-4-ANDROSTENE-17β-OL (a) According to Example 3(a), 10 g. of 17α-methyltestosterone are reacted with 3.25 g. of 2-aminobutanol-1. The resultant compound exhibits the following properties: melting point 166° C.; $\lambda_{max}$ 239–240 mμ, $E_{1\ cm.}^{1\%}$ 555 (96% ethanol)

$(\alpha)_D^{28}$: +131° (ethanol).

(b) 10 g. of 17α-methyltestosterone are mixed with 5.25 g. freshly distilled 2-(α-hydroxy-methyl-n-propyl)-iminobutane in 150 cc. absolute ethanol and 50 cc. benzene. This mixture is then slowly distilled, and the residual solvent is removed under reduced pressure. The residue, recrystallized from acetone, melts at 166° C.

Example 5

3-(1'-DESOXYSORBITYL-1')-IMINO-17α-METHYL-4-ANDROSTENE-17β-OL (a) 10 g. of 17α-methyltestosterone are heated under reflux with 6.6 g. glucamine for one hour to boiling in 500 cc. methanol and 150 cc. chloroform. The resultant mixture is then distilled, and the residual solvent is removed under reduced pressure. The residue, recrystallized from ethyl acetate, has the following properties: melting point 98–100° C.; (Decomp.) IR-absorption at 1630 cm.$^{-1}$.

(b) 10 g. of 17α-methyltestosterone are heated to boiling with 8.6 g. 2-(1'-desoxysorbityl-1')-iminobutane for one hour under reflux in 500 cc. methanol and 150 cc. chloroform. The mixture is then distilled and the residual solvent is removed under reduced pressure. The resultant compound, recrystallized from ethyl acetate, has the following properties: melting point 98–100° C.; (Decomp.) IR-absorption at 1630 cm.$^{-1}$.

Example 6

3,17-BIS-(β,γ-DIHYDROXY-n-PROPYL)-IMINO-1,4-ANDROSTADIENE 10 g. of 1,4-androstadiene-3,17-dione are dissolved in 100 cc. ethanol and 60 cc. absolute benzene and mixed with 6.4 g. of 1-aminopropane-2,3-diol. The mixture is concentrated on a steam bath, and the residual solvent is removed under reduced pressure. The resultant compound, recrystallized from ethyl acetate, exhibits the following properties: melting point 78° C. (Decomp.), $(\alpha)_D^{25}$: +110° (ethanol), $\lambda_{max}$ 260 mμ, $E_{1\ cm.}^{1\%}$ 379

Example 7

3-(β-HYDROXY-n-PROPYL)-IMINO-1,4-ANDROSTADIENE-17β-OL-17-PROPIONATE

10 g. of 1-dehydro-testosterone-propionate are dissolved in 70 cc. ethanol and 10 cc. benzene and mixed with 2.82 g. of 1-aminopropanol-2. The solvents are distilled off on a steam bath; the residue is boiled with petroleum ether and the crystals are filtered off. After being recrystallized from ether, the product melts at 150–151° C. and exhibits the following properties: $\lambda_{max}$ 256–257 m$\mu$, $E^{1\%}_{1cm.}$ 446

$(\alpha)_D^{25}$: +82° (chloroform).

Example 8

3-(β-HYDROXY-n-PROPYL)-IMINO-4-ANDROSTENE-17-OL-17-PROPIONATE

10 g. of testosterone propionate are dissolved in 70 cc. ethanol and 10 cc. benzene and mixed with 2.82 g. of 1-amino-propanol-2. The solvents are distilled off on a steam bath; the residue is boiled with petroleum ether and the crystals are filtered off. After recrystallization from ethyl acetate, the product melts at 136° C., and exhibits the following properties: $\lambda_{max}$ 239–240 m$\mu$, $E^{1\%}_{1cm.}$ 446

$(\alpha)_D^{25}$: +130° (chloroform).

Example 9

3,17-BIS-(β,γ-DIHYDROXY-n-PROPYL)-IMINO-4-ANDROSTENE

(a) 10 g. of 4-androstene-3,17-dione are dissolved in 200 cc. absolute alcohol and 50 cc. absolute benzene and mixed with 6.2 g. of 1-amino-propane-2,3-diol. The compound is concentrated on a steam bath and the residual solvent is removed under reduced pressure. During the cooling process, the compound is crystallized. It is then treated with ethyl acetate, filtered and recrystallized from ethyl acetate, and exhibits the following properties: melting point 85° C.; $(\alpha)_D^{25}$: +60° (ethanol), $\lambda_{max}$ 240–241 m$\mu$, $E^{1\%}_{1cm.}$ 338

(b) 10 g. of 4-androstene-3,17-dione are dissolved in 200 cc. absolute alcohol and 50 cc. absolute benzene and mixed with 9.9 g. of 2-(β,γ-dihydroxy-n-propyl)-imino-butane. This mixture is concentrated on a steam bath and the residual solvent is removed under reduced pressure. The compound is crystallized during the cooling process, and then is treated with acetic ester, filtered and recrystallized from ethyl acetate: melting point 85° C.

In the same manner, 4-androstene-3,17-dione is reacted with 3-(β,γ-dihydroxy-n-propyl)-imino-pentane to form 3,17-bis-(β,γ-dihydroxy-n-propyl)-imino-4-androstene.

Example 10

3,17-BIS-(1'-DESOXYSORBITYL-1')-IMINO-1,4-ANDROSTADIENE

10 g. of 1,4-androstadiene-3,17-dione are introduced into a clear boiling solution of 13 g. 1-desoxy-D-sorbityl-1-amine in one liter of methanol and diluted with 200 cc. chloroform. This mixture is heated to boiling for one hour under reflux, concentrated on a steam bath, wherein two 100 cc. chloroform aliquots are admixed. The residue crystallizes during the cooling process, is triturated with ether and filtered off. The raw product is dissolved in ether, purified with activated carbon and is crystallized, exhibiting the following properties: melting point 93° C.; $\lambda_{max}$ 255 m$\mu$, $E^{1\%}_{1cm.}$ 215

Example 11

3-(1'-DESOXY-D-SORBITYL-1')-IMINO-4-ANDROSTENE-17β-OL

6.9 g. of 1-desoxy-D-sorbityl-1-amine are dissolved in 500 cc. methanol. 10 g. of testosterone and 150 cc. benzene are added and the mixture is heated to boiling for one hour under reflux. The solvents are thereafter removed from the residue, recrystallized from acetone, exhibits the following properties: melting point 157° C.; $\lambda_{max}$ 241 m$\mu$, $E^{1\%}_{1cm.}$ 373

$(\alpha)_D^{24}$: +82° (ethanol).

Example 12

3-(3-(β,γ-DIHYDROXY-n-PROPYL)-IMINO-4-ANDROSTENE-17β-OL

10 g. of testosterone are dissolved in 150 cc. absolute ethanol and 100 cc. benzene and mixed with 3.6 g. of 1-amino-propane-2,3-diol. The mixture is slowly concentrated on a steam bath and the residual solvent is removed under reduced pressure. The resultant product, crystallized from ethyl acetate, exhibits the following properties: melting point 86° C. (Decomp.); $\lambda_{max}$ 240 m$\mu$, $E^{1\%}_{1cm.}$ 275

Example 13

3-(1'-DESOXY-L-ARABITYL-1')-IMINO-4-ANDROSTENE-17β-OL

5.8 g. of 1-desoxy-L-arabityl-1-amine are dissolved in 300 cc. methanol. 10 g. of testosterone and 150 cc. benzene are added and the solution is heated to boiling for one hour under reflux. The solvents are removed. The residue, after being boiled and triturated with ethyl acetate several times, is crystallized, and exhibits the following properties: melting point 70° C. (Decomp.); $(\alpha)_D^{25}$: +88° (ethanol); $\lambda_{max}$ 241 m$\mu$, $E^{1\%}_{1cm.}$ 341

Example 14

3-(1'-DESOXY-L-ARABITYL-1')-IMINO-17α-METHYL-4-ANDROSTENE-17β-OL

5.5 g. of 1-desoxy-L-arabityl-1-amine are dissolved in 300 cc. methanol. 10 g. of 17α-methyltestosterone and 200 cc. chloroform are added and the mixture is heated to boiling for one hour under reflux. The mixture is then concentrated and the residual solvent is removed under reduced pressure. The resultant product is recrystallized from ethyl acetate; the component insoluble in ethyl acetate being rejected. The product exhibits the following properties: melting point 92° C.; $\lambda_{max}$ 240 m$\mu$, $E^{1\%}_{1cm.}$ 269

Example 15

3,17-BIS-(1'-DESOXY-L-ARABITYL-1')-IMINO-4-ANDROSTENE

13 g. of 1-desoxy-L-arabityl-1-amine are dissolved in 500 cc. methanol. 10 g. of 4-androstene-3,17-dione, 100 cc. benzene and 100 cc. chloroform are added. The mixture is concentrated whereby 250 cc. chloroform are continually added dropwise. All solvents are finally removed under reduced pressure. The resultant product, crystallized from ethyl acetate, exhibits the following properties: melting point 80° C.; $\lambda_{max}$ 242 m$\mu$, $E^{1\%}_{1cm.}$ 209

Example 16

3-(β,γ-DIHYDROXY-n-PROPYL)-IMINO-17α-METHYL-1,4-ANDROSTADIENE-17β-OL

6 g. of 17α-methyl-1,4-androstadiene-3-one-17β-ol are dissolved in 100 cc. absolute ethanol, mixed with 2 g. 1-amino-propane-2,3-diol and 100 cc. benzene. The mixture is slowly distilled and the residual solvent is removed under reduced pressure. The residue, recrystallized from benzene, exhibits the following properties: melting point 68° C.; $(\alpha)_D^{24}$: +18° (chloroform); $\lambda_{max}$ 256 m$\mu$, $E^{1\%}_{1cm.}$ 409

Example 17

3,17-BIS-(1'-DESOXY-L-ARABITYL-1')-IMINO-1,4-ANDROSTADIENE (a) 10 g. of 1,4-androstadiene-3,17-dione are introduced into a solution of 15.6 g. of L-arabamine in 1.3 liters methanol. The compound is slowly concentrated to dryness. The residue is crystallized from acetone, and the raw crystalline product is digested with ethanol. The filtrate is evaporated under reduced pressure to dryness and recrystallized from acetone, and exhibits the following properties: melting point 84° C.; $\lambda_{max}$ 256 m$\mu$, $$E_{1\,cm.}^{1\%}\,212\;(96\%\;ethanol)$$

IR-bands at 1660, 1610 and 1580 cm.$^{-1}$.

(b) 10 g. of 1,4-androstadiene-3,17-dione are dissolved in 300 cc. absolute ethanol, and mixed with a solution of 20 g. 2-(1'-desoxy-L-arabityl-1')-imino-propane in 250 cc. absolute ethanol as well as with 100 cc. toluene. The compound is slowly concentrated to dryness. The residue is digested with ethanol, the undissolved portion being filtered off. The filtrate is concentrated under reduced pressure to dryness and the residue is crystallized by means of triturating with acetone. Melting point 84° C.

Example 18

3,17-BIS-(1'-DESOXY-D-SORBITYL-1')-IMINO-4-ANDROSTENE 13 g. of D-glucamine are dissolved in 800 cc. methanol and, after having added a solution of 10 g. 4-androstene-3,17-dione, in 300 cc. chloroform, and 200 cc. benzene, the mixture is heated for one hour under reflux. It is then concentrated to dryness, crystallized with ether, and exhibits the following properties: melting point 94° C. (Decomp.); $\lambda_{max}$ 240 m$\mu$, $$E_{1\,cm.}^{1\%}\,174\;(96\%\;ethanol)$$

IR-bands at 1670 and 1630 cm.$^{-1}$.

Example 19

3,17-BIS-($\beta,\gamma$-DIHYDROXY-n-PROPYL)-IMINO-9$\alpha$-FLUOR-1,4-ANDROSTADIENE-11$\beta$-OL 3.5 g. of 9$\alpha$-fluor-1,4-androstadiene-3,17-dione-11$\beta$-ol are dissolved in a mixture of 50 cc. absolute ethanol and 50 cc. chloroform and this solution is mixed with 2.2 g. of 1-amino-propane-2,3-diol and 50 cc. benzene. The mixture is slowly concentrated to dryness. The residue, recrystallized from ethyl acetate, exhibits the following properties: melting point 108° C.; $\lambda_{max}$ 251–252 m$\mu$, $$E_{1\,cm.}^{1\%}\,337\;(96\%\;ethanol)$$

IR-bands at 1670, 1625 and 1590 cm.$^{-1}$.

Example 20

3-(n-BUTYL)-IMINO-17$\alpha$-METHYL-4-ANDROSTENE-17$\beta$-OL 10 g. of 17$\alpha$-methyltestosterone are dissolved in 100 cc. n-butylamine. The mixture is distilled to dryness; the residue is dissolved in methanol and evaporated under reduced pressure to dryness. A solid foam is thus obtained with a melting point of 96° C.; IR-bands at 1630 cm.$^{-1}$.

In the same way, 17$\alpha$-methyltestosterone is reacted with n-octylamine or cyclohexylamine respectively, whereby 3-n-octyl-imino-17$\alpha$-methyl-4-androstene-17$\beta$-ol or 3-cyclohexyl-imino-17$\alpha$-methyl-4-androstene-17$\beta$-ol is obtained.

Example 21

3,17-BIS-(1'-DESOXY-D-XYLITYL-1')-IMINO-1,4-ANDROSTADIENE 5 g. of 1,4-androstadiene-3,17-dione are dissolved in 100 cc. absolute ethanol and mixed with 6.4 g. of D-xylamine as well as 50 cc. benzene. The mixture is slowly distilled, terminally under reduced pressure. The residue, crystallized from ethyl acetate, exhibits the following properties: melting point 111° C. (Decomp.); $\lambda_{max}$ 253–257 m$\mu$, $$E_{1\,cm.}^{1\%}\,250\;(96\%\;ethanol)$$

IR-bands at 1670, 1625 and 1590 cm.$^{-1}$.

Example 22

3-(1'-DESOXY-D-SORBITYL-1')-IMINO-17$\alpha$-METHYL-1,4-ANDROSTADIENE-17$\beta$-OL 6 g. of 1-dehydro-17$\alpha$-methyltestosterone are dissolved in 100 cc. ethanol, and mixed with a solution of 6.3 g. D-glucamine in 630 cc. methanol as well as with 150 cc. toluene. The compound is slowly distilled to dryness, terminally under reduced pressure. The residue is dissolved in 200 cc. methanol and introduced into 500 cc. benzine, whereby excess glucamine is precipitated and filtered off. The filtrate is distilled under reduced pressure to dryness and the residue is crystallized by triturating with ethyl acetate and exhibits the following properties: melting point 102° (decomp.); $\lambda_{max}$ 258 m$\mu$, $$E_{1\,cm.}^{1\%}\,281\;(96\%\;ethanol)$$

IR-bands at 1660, 1620 and 1590 cm$^{-1}$.

Example 23

3-(1'-DESOXY-D-SORBITYL-1')-IMINO-1,4-ANDROSTADIENE-17$\beta$-OL 10 g. of 1-dehydro-testosterone are dissolved in 100 cc. absolute ethanol and mixed with a solution of 7.2 g. D-glucamine in 600 cc. methanol as well as with 50 cc. absolute toluene. The compound is slowly concentrated, terminally under reduced pressure. The residue is triturated with water and then extracted with n-butanol. The butanol solution is washed with water three times and evaporated under reduced pressure to dryness. The residue, crystallized from acetone, exhibits the following properties. melting point 167–168° C.; $\lambda_{max}$ 257–258 m$\mu$.

$$E_{1\,cm.}^{1\%}\,383\;(96\%\;ethanol)$$

$(\alpha)_D^{25}$: $+25°$ (methanol); IR-bands at 1665, 1615 and 1580 cm.$^{-1}$.

Example 24

3-(1'-DESOXY-L-ARABITYL-1')-IMINO-1,4-ANDROSTADIENE-17$\beta$-OL 7 g. of 1-dehydro-testosterone are dissolved in 300 cc. absolute ethanol and mixed with a solution of 6.3 g. L-arabamine in 600 cc. methanol as well as with 50 cc. toluene. The mixture is treated as in Example 23 and the residue of the butanol extract is crystallized by means of triturating with ethyl acetate, and exhibits the following properties: melting point 96° C. (decomp.); $\lambda_{max}$ 257 m$\mu$, $$E_{1\,cm.}^{1\%}\,359\;(96\%\;ethanol)$$

IR-bands at 1665, 1615 and 1585 cm.$^{-1}$.

Example 25

3-(1'-DESOXY-D-SORBITYL-1')-IMINO-16-METHYLENE-17$\alpha$-METHYL-1,4-ANDROSTADIENE-17$\beta$-OL 5.8 g. of 16-methylene-17$\alpha$-methyl-1,4-androstadiene-3-one-17$\beta$-ol are dissolved in 200 cc. absolute ethanol and mixed with a solution of 5.7 g. D-glucamine in 500 cc. methanol as well as with 100 cc. toluene. The compound is slowly concentrated to dryness. The residue is triturated with water and is then extracted with chloroform. The extract is washed with water, dried over sodium sulfate, filtered and evaporated. The residue, crystallized after triturating with ethyl acetate, exhibits the following properties: melting point 90° C. (decomp.); $\lambda_{max}$ 257 m$\mu$, $$E_{1\,cm.}^{1\%}\,366\;(96\%\;ethanol)$$

IR-bands at 1660, 1610 and 1580 cm.$^{-1}$.

Example 26

3-(1'-DESOXY-L-ARABITYL-1')-IMINO-17α-METHYL-1,4-ANDROSTADIENE-17β-OL 7 g. of 1-dehydro-17α-methyltestosterone are treated in 100 cc. absolute ethanol with a solution of 3.9 g. L-arabamine in 200 cc. methanol and 50 cc. absolute toluene and purified as set forth in Example 23. The residue of the butanol extract, crystallized when triturated with ethyl acetate, exhibits the following properties: melting point 98° C. (decomp.); $\lambda_{max}$ 257 m$\mu$, $E_{1\,cm.}^{1\%}$ 328 (96% ethanol)

IR-bands at 1660, 1620 and 1580 cm.$^{-1}$.

Example 27

3-(1'-DESOXY-D-XYLITYL-1')-IMINO-17α-METHYL-4-ANDROSTENE-17β-OL 10 g. of 17α-methyltestosterone are dissolved in 100 cc. absolute ethanol and mixed with 5 g. D-xylamine as well as 50 cc. toluene. The compound is distilled slowly, under reduced pressure, until dry. The residue, crystallized after being triturated with ethyl acetate, exhibits the following properties: melting point 80° C. (71° C. coalescing); $\lambda_{max}$ 242–243 m$\mu$, $E_{1\,cm.}^{1\%}$ 359 (96% ethanol)

IR-bands at 1630 cm.$^{-1}$.

Example 28

3-(1'-DESOXY-L-ARABITYL-1')-IMINO-16-METHYLENE-17α-METHYL-1,4-ANDROSTADIENE-17β-OL (a) 9 g. of 16-methylene-17α-methyl-1,4-androstadiene-3-one-17β-ol are treated in 100 cc. absolute ethanol with a solution of 4.8 g. L-arabamine in 300 cc. methanol and 50 cc. absolute toluene and purified according to Example 22. The raw product is crystallized by triturating with ethyl acetate, filtered off and once more mixed with the same amount of ethanol, L-arabamine, methanol and toluene as before. The compound is then distilled until dry and the residue, crystallized by triturating with ethyl acetate, exhibits the following properties: melting point 59° C.; $\lambda_{max}$ 254–257 m$\mu$, $E_{1\,cm.}^{1\%}$ 312 (96% ethanol)

IR-bands at 1660, 1620 and 1580 cm.$^{-1}$.

(b) 5 g. of 16-methylene-17α-methyl-1,4-androstadiene-3-one-17β-ol are dissolved in 300 cc. absolute ethanol and mixed with a solution of 7.7 g. 2-(1'-desoxy-L-arabityl-1')-imino-propane in 250 cc. ethanol as well as with 150 cc. toluene. The compound is slowly distilled, terminally under reduced pressure. The residue is triturated with water and extracted with chloroform; the extract is washed with water three times, and dried. The residue crystallizes when triturated with ethyl acetate; melting point 59° C.

Example 29

3-(1'-DESOXY-D-XYLITYL-1')-IMINO-17α-METHYL-1,4-ANDROSTADIENE-17β-OL 5 g. of 1-dehydro-17α-methyltestosterone are dissolved in 100 cc. absolute ethanol and mixed with 3.1 g. 92% D-xylamine as well as with 50 cc. benzene. The mixture is concentrated to dryness. The residue is crystallized by triturating with ethyl acetate, and exhibits the following properties: melting point 90° C. (Decomp.); $\lambda_{max}$ 256 m$\mu$, $E_{1\,cm.}^{1\%}$ 293 (96% ethanol)

IR-bands at 1660, 1620 and 1580 cm.$^{-1}$.

In the same way, utilizing β-hydroxy-n-octylamine, the 3-(β-hydroxy-n-octyl)-imino-17α-methyl-1,4-androstadiene-17β-ol is obtained.

Example 30

3-(1'-DESOXY-D-XYLITYL-1')-IMINO-1,4-ANDROSTADIENE-17β-OL 5 g. of 1-dehydro-testosterone are dissolved in 100 cc. absolute ethanol and mixed with 5 g. D-xylamine as well as with 100 cc. benzene. The mixture is concentrated to dryness. The residue is then dissolved in n-butanol, the solution washed with water three times and the solvent is thereafter removed under reduced pressure. The residue crystallizes when triturated with ethyl acetate to yield a compound having the following properties: melting point 70° C. partly and 95° C.; $\lambda_{max}$ 255–256 m$\mu$, $E_{1\,cm.}^{1\%}$ 349 (96% ethanol)

IR-bands at 1660, 1615 and 1580 cm.$^{-1}$.

Example 31

3-(1'-DESOXY-D-XYLITYL-1')-IMINO-16-METHYLENE-17α-METHYL-1,4-ANDROSTADIENE-17β-OL 5 g. of 16-methylene-17α-methyl-1,4-androstadiene-3-one-17β-ol are dissolved in 200 cc. absolute ethanol and mixed with 5.8 g. 92% D-xylamine and 100 cc. absolute benzene in 200 cc. absolute ethanol. The compound is slowly distilled. The residue is intensively triturated with water, which is decanted. Then it is dissolved in ethanol; chloroform is added and the solvent is removed. The residue is once more dissolved in chloroform, the solution is filtered over sodium sulfate and evaporated. The residue, crystallized by triturating with ethyl acetate, exhibits the following properties: melting point 91° C.; $\lambda_{max}$ 256–257 m$\mu$, $E_{1\,cm.}^{1\%}$ 389 (96% ethanol)

IR-bands at 1660, 1615 and 1580 cm.$^{-1}$.

Example 32

3-(β,γ-DIHYDROXY-n-PROPYL)-IMINO-16-METHYLENE-17α-METHYL-1,4-ANDROSTADIENE-17β-OL 33 g. of 16-methylene-17α-methyl-1,4-androstadiene-3-one-17β-ol are dissolved in 500 cc. absolute ethanol and mixed with 10 g. 1-amino-propane-2,3-diol and 500 cc. benzene. The mixture is slowly distilled, terminally under reduced pressure. The residue is extracted by chloroform; the solution is agitated with water three times, dried over sodium sulfate, filtered and the solvent is removed under reduced pressure. The residue is dissolved in 150 cc. ethyl acetate and mixed in with 500 cc. benzine. It is then filtered off and dried, yielding the following properties: melting point 110° C. (Decomp.); $\lambda_{max}$ 255 m$\mu$, $E_{1\,cm.}^{1\%}$ 468 (96% ethanol)

IR-bands at 1660, 1610 and 1580 cm.$^{-1}$.

Example 33

3-(β,γ-DIHYDROXY-n-PROPYL)-IMINO-1,4-ANDROSTADIENE-17β-OL 8.1 g. of 1-dehydro-testosterone are treated with 100 cc. absolute ethanol, 2.8 g. of 1-amino-propane-2,3-diol and 50 cc. benzene and processed according to Example 32. The chloroform residue is recrystallized from ethyl acetate, yielding the following properties: melting point 89° C. (Decomp.); $\lambda_{max}$ 256 m$\mu$, $E_{1\,cm.}^{1\%}$ 479 (96% ethanol)

IR-bands at 1660, 1610 and 1580 cm.$^{-1}$.

Example 34

3-(β,γ-DIHYDROXY-n-PROPYL)-IMINO-4-ANDROSTENE-17β-OL-17-PROPIONATE 10 g. of testosterone-17-propionate are dissolved in 100 cc. absolute ethanol and mixed with 3.14 g. of 1-amino-propane-2,3-diol and 50 cc. methanol. The solvent is slowly distilled off. The residue, crystallized when triturated with petroleum ether, exhibits the following properties: melting point 95° C. (preliminary coalescing); $\lambda_{max}$ 240–241 m$\mu$, $E_{1\,cm.}^{1\%}$ 289 (96% ethanol)

IR-bands at 1730 and 1625 cm.$^{-1}$.

Example 35
3-(β,γ-DIHYDROXY-n-PROPYL)-IMINO-1,4-ANDROSTA-DIENE-17β-OL-17-PROPIONATE 10 g. of 1dehydro-testosterone-17-propionate are treated with 100 cc. absolute ethanol, 100 cc. chloroform, 50 cc. benzene and 2.93 g. of 1-amino-propane-2,3-diol according to Example 31, and processed. The chloroform residue is dissolved in ether and precipitated with benzine, and exhibits the following properties: melting point 131° C.; $\lambda_{max}$ 257 mμ, $$E_{1cm.}^{1\%} \ 426 \ (96\% \ \text{ethanol})$$

IR-bands at 1730, 1660, 1610 and 1585 cm.$^{-1}$.

Example 36
3-(β,γ-DIHYDROXY-n-PROPYL)-IMINO-9α-FLUOR-4-ANDROSTENE-11β,17β-DIOL 5 g. of 9α-fluoro-4-androstene-3-one-11β,17β-diol are reacted according to Example 34. The raw product crystallized when triturated with ethyl acetate, exhibits the following properties: melting point 101° C.; $\lambda_{max}$ 239 mμ, $$E_{1cm.}^{1\%} \ 311 \ (96\% \ \text{ethanol})$$

IR-bands at 1635 cm.$^{-1}$.

Example 37
3-(δ-HYDROXYBUTYL)-IMINO-ANDROSTANE-17β-OL-4-ONE-17-PROPIONATE 3 g. of 4-hydroxy-testosterone-17-propionate are mixed with 1.7 g. of δ-hydroxy butylamine in a mixture of 50 cc. portions of absolute ethanol, chloroform and benzene. The reaction product is concentrated to dryness, and the residue, crystallized from methanol, exhibits the following properties: $\lambda_{max}$ 308–309 mμ, IR-bands at 1730 and 1670/1630 cm.$^{-1}$ (double band).

From the foregoing examples and general description, one skilled in the art can easily ascertain the essential characteristics of the present invention, and without departing from the spirit and scope of these essential characteristics, can subject this invention to various usages, conditions, and modifications. For example, Schiff bases at the 3-position of other steroids may be synthesized, but these compounds are obviously based on the teachings of this invention. Consequently, such new compounds and other changes based on this invention are properly, equitably and intended to fall within the scope of equivalence of the following claims.

What we claim is:
1. Compounds of the formula

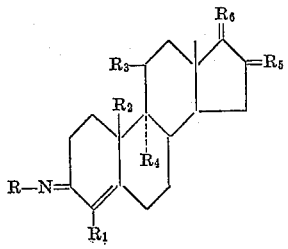

wherein $R_1$ is selected from the group consisting of H and OH,
wherein $R_2$ represents $CH_3$,
wherein $R_3$ is selected from the group consisting of H and β-OH,
wherein $R_4$ is selected from the group consisting of H and F,
wherein $R_5$ is selected from the group consisting of H,H and $CH_2$,
wherein $R_6$ is selected from the group consisting of α-H, β-OH; β-OH, an α-alkyl group containing 1–3 carbon atoms; and =N—R,
wherein R is selected from the group consisting of an alkyl group containing 1–8 carbon atoms; cyclohexyl; and an hydroxyalkyl group containing 3–8 carbon atoms and 1–5 hydroxy radicals.

2. The compounds of claim 1, further comprising a double bond in the 1,2-position.
3. 3-(β,γ-dihydroxy-n-propyl)-imino-16 - methylene-17α-methyl-1,4-androstadiene-17β-ol.
4. 3-(β,γ-dihydroxy-n-propyl)-imino-1,4-androstadiene-17β-ol.
5. 3-(β,γ-dihydroxy-n-propyl)-imino - 9α - fluoro - 4-androstene-11β,17β-diol.
6. 3-(β,γ-dihydroxy-n-propyl)-imino-17α - methyl - 4-androstene-17β-ol.
7. 3-(β-hydroxy-n-propyl)-imino-17α-methyl - 4 - androstene-17β-ol.
8. 3-(γ-hydroxy-n-propyl)-imino-17α-methyl - 4 - androstene-17β-ol.
9. 3-(α-hydroxymethyl-n-propyl)-imino-17α-methyl - 4-androstene-17β-ol.
10. 3-(β-hydroxy-n-propyl)-imino-1,4 - androstadiene-17β-ol-17-propionate.
11. 3-(β-hydroxy-n-propyl)-imino-4-androstene-17 - ol-17-propionate.
12. 3-(β,γ-dihydroxy-n-propyl)-imino - 4 - androstene-17β-ol.
13. 3-(β,γ-dihydroxy-n-propyl)-imino-17α-methyl - 1,4-androstadiene-17β-ol.
14. 3-(1′-desoxy-L-arabityl-1′)-imino-16 - methylene-17α-methyl-1,4-androstadiene-17β-ol.
15. 3-(1′-desoxy-D-xylityl-1′)-imino-17α-methyl - 1,4-androstadiene-17β-ol.
16. 3-(1′-desoxy-D-xylityl-1′)-imino-1,4 - androstadiene-17β-ol.
17. 3-(1′-desoxy-D-xylityl-1′)-imino-16-methylene-17α-methyl-1,4-androstadiene-17β-ol.
18. 3-(β,γ-dihydroxy-n-propyl)-imino - 4 - androstene-17β-ol-17-propionate.
19. 3-(β,γ-dihydroxy-n-propyl)-imino-1,4 - androstadiene-17β-ol-17-propionate.
20. 3-(δ-hydroxybutyl)-imino-androstane-17β-ol-4-one-17-propionate.

No references cited.